(12) United States Patent
Shaffer et al.

(10) Patent No.: US 8,385,228 B2
(45) Date of Patent: Feb. 26, 2013

(54) COMMUNICATION PARADIGM SWITCHING BASED ON LINK QUALITY INFORMATION

(75) Inventors: Shmuel Shaffer, Palo Alto, CA (US); Amit Prakash Barave, Sunnyvale, CA (US); Zeeshan Rahman Khan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 276 days.

(21) Appl. No.: 11/969,045

(22) Filed: Jan. 3, 2008

(65) Prior Publication Data
US 2009/0175193 A1  Jul. 9, 2009

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/254; 370/401; 370/465
(58) Field of Classification Search .............. None
See application file for complete search history.

(56) References Cited

U.S. PATENT DOCUMENTS

| | | | |
|---|---|---|---|
| 7,490,125 B1 * | 2/2009 | Jagadeesan et al. | 709/204 |
| 7,539,127 B1 | 5/2009 | Shaffer et al. | |
| 7,899,478 B2 * | 3/2011 | Fodor | 455/518 |
| 2003/0185233 A1 * | 10/2003 | Ji et al. | 370/466 |
| 2004/0192221 A1 * | 9/2004 | Matsunaga | 455/76 |
| 2005/0080884 A1 * | 4/2005 | Siorpaes et al. | 709/223 |
| 2005/0100028 A1 * | 5/2005 | Knauerhase et al. | 370/401 |
| 2005/0239498 A1 * | 10/2005 | Dorenbosch et al. | 455/552.1 |
| 2006/0262800 A1 * | 11/2006 | Martinez et al. | 370/395.52 |
| 2006/0268711 A1 * | 11/2006 | Doradla et al. | 370/235 |
| 2006/0276192 A1 * | 12/2006 | Dutta et al. | 455/436 |
| 2007/0064630 A1 * | 3/2007 | Olivier et al. | 370/278 |
| 2007/0140276 A1 * | 6/2007 | Yokota | 370/401 |
| 2007/0153815 A1 * | 7/2007 | She et al. | 370/401 |
| 2008/0049673 A1 * | 2/2008 | Park et al. | 370/331 |
| 2008/0200195 A1 * | 8/2008 | Abe et al. | 455/501 |

* cited by examiner

*Primary Examiner* — Chirag Shah
*Assistant Examiner* — Suk Jin Kang
(74) *Attorney, Agent, or Firm* — Schwegman, Lundberg & Woessner, P.A.

(57) ABSTRACT

In an example embodiment, a method is provided that accesses a list of communication preferences. The list identifies a communication paradigm and a different communication paradigm. Link quality information associated with the communication paradigm also is accessed. Based on the link quality information, communication may be switched from the communication paradigm to the different communication paradigm.

17 Claims, 7 Drawing Sheets

FIG. 1

APPARATUS 200

INTEROPERABILITY AND COLLABORATION SERVER MODULE 202

POLICY MODULE 208

MULTIMODAL COMMUNICATION MODULE 204

MONITORING MODULE 206

COMMUNICATION PARADIGM SWITCHING BASED ON LINK QUALITY INFORMATION

FIELD

The present disclosure relates generally to communication systems. In an example embodiment, the disclosure relates to communication paradigm switching based on link quality information.

BACKGROUND

Interoperability communication systems are used to facilitate communication across different communication paradigms, such as public switched telephone networks (PSTNs) and radio networks. As a result, land-based radios, for example, can communicate with PSTN, cellular, or Voice over Internet Protocol (VoIP) telephones. To ensure the availability of communication, each individual communication network has backups. For example, computer networks have redundant routers to ensure connectivity when one or more routers fail. In another example, radio networks may utilize another radio frequency channel to provide redundancy and serve as backups when one or more radio towers become unavailable. Although each individual communication network has its own backup services, the interoperability communication system, as a whole, is still vulnerable to communication failures because the backup services operate only within the individual communication networks.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

An example method is provided that accesses a list of communication preferences. The list identifies a communication paradigm and a different communication paradigm. Link quality information associated with the communication paradigm also is accessed. Based on the link quality information, communication may be switched from the communication paradigm to the different communication paradigm.

Example Embodiments

Figure 1:
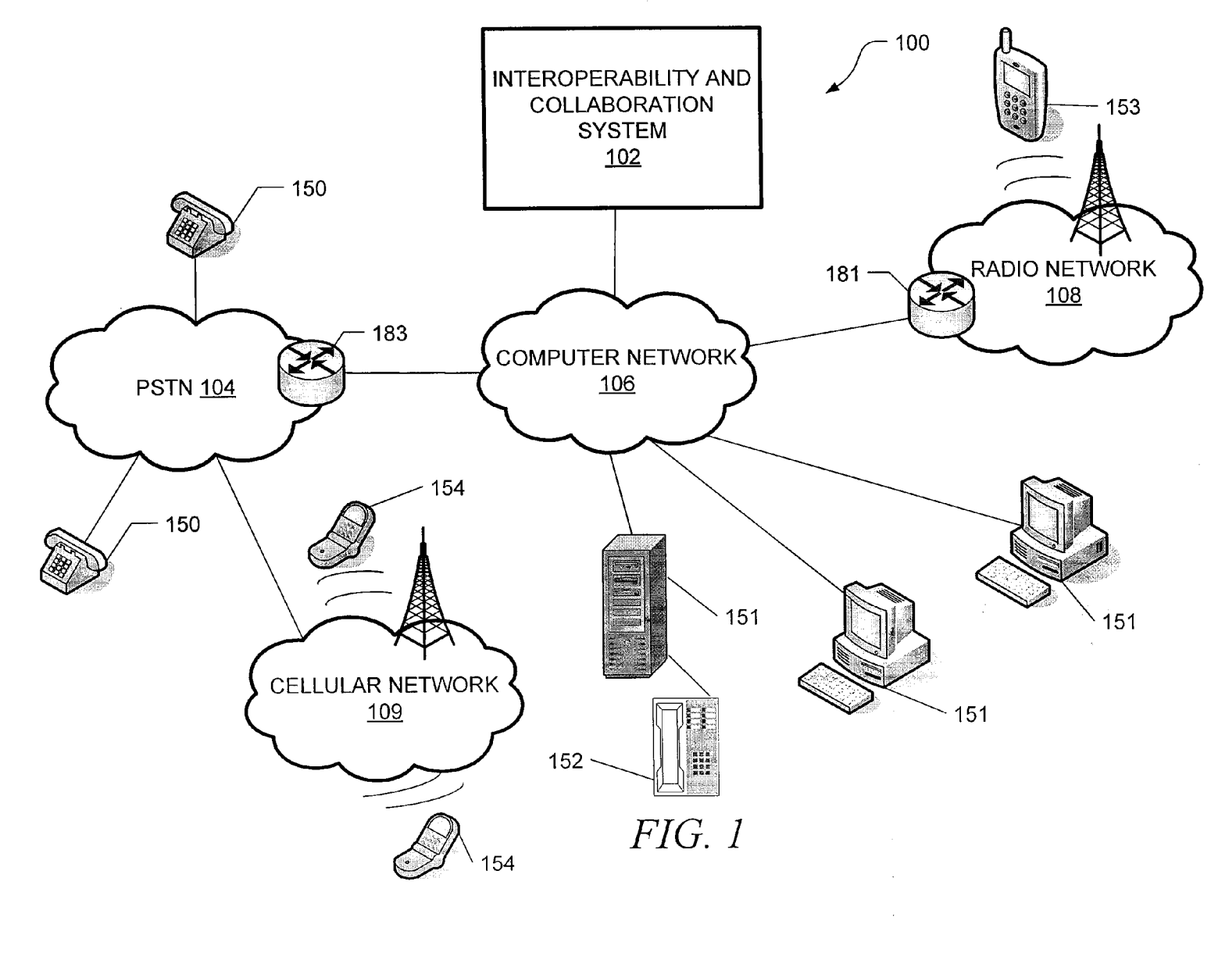
FIG. 1 is a simplified diagram of a communication system, in accordance with an example embodiment.

FIG. 1 is a simplified diagram of a communication system, in accordance with an example embodiment. Communication system 100 includes interoperability and collaboration system 102 in communication with public switched telephone network (PSTN) 104, cellular network 109, radio network 108, and various networked computing devices (e.g. computers 151 and Voice over Internet Protocol (VoIP) phone 152) by way of computer network 106. Also included in communication system 100 are communication devices 150-154. A communication device is a piece of equipment used in communication and is associated with or attached to a communication network. Examples of communication devices include telephones 150, computers 151, VoIP phones 152, radios 153, mobile phones 154, routers, switches, transmission systems, relay systems, and other communication devices.

Generally, interoperability and collaboration system 102 facilitates communication interoperability amongst different communication paradigms. A communication paradigm (or a communication modality) is a mode of communication amongst a collection of interrelated communication devices. The communication paradigm can be distinguished by data format, type of signal, physical link or infrastructure or other communication characteristics. In an example embodiment, communication paradigms may be distinguished by the type of duplex system. For example, as shown in FIG. 1, PSTN 104, cellular network 109, and computing devices (e.g., VoIP phone 152, computers 151 and other communication devices) attached to computer network 106 are full duplex systems. In general, a full duplex system is a communications mode that provides simultaneous transmission and reception in both directions. The PSTN 104, cellular network 109, and computers 151 and VoIP phone 152 connected to computer network 106 can be grouped into one communication paradigm. As such, for example, communication between VoIP phone 152 and telephone 150 is within the same communication paradigm.

It should be appreciated that PSTN 104, which can also be referred to as a Plain Old Telephone System (POTS), is a collection of interconnected systems operated by telephone companies. The PSTN 104 may, for example, include telephones 150, switches, and other systems and elements. The PSTN 104 may communicate with computer network 106 by way of gateway 183.

In general, computer network 106 is a collection of interconnected computing devices that communicate utilizing wired or wireless mediums. Computing devices included in computer network 106 may include VoIP phone 152, computers 151, routers, switches, and other computing devices. Examples of computer networks, such as computer network 106, include Local Area Networks (LANs) and/or Wide Area Networks (WANs), such as the Internet. Another example of a communication paradigm is radio network 108.

Another example of a full duplex system is cellular network 109, which is a type of radio network. Examples of cellular network 109 include code division multiple access (CDMA), time division multiple access (TDMA), and other cellular networks. Mobile phones 154, for example, may be included in cellular network 109. Cellular network 109 may be in communication with PSTN 104.

On the other hand, in the example illustrated in FIG. 1, radio network 108 is a half duplex system. A half duplex system provides for communication in both directions, but in only one direction at a time. Since, in an example embodiment, the communication paradigms can be distinguished based on the type of duplex system, radio network 108 can be grouped into another, different communication paradigm. The radio network 108 is a collection of communication devices that communicate over radio waves, such as ultra high frequency (UHF) and very high frequency (VHF). The radio network 108 includes, for example, a land-mobile-radio (LMR) network. Examples of communication devices included in radio network 108 include UHF radio 153, VHF radios, and other radio network-based communication devices. It should be noted UHF radio 153 or other communication devices included in radio network 108 are push-to-talk radios that operate in half duplex mode, which is in contrast to phones 150 that operate in full duplex mode. The radio network 108 may communicate with computer network 106 by way of gateway 181.

As discussed above, in addition to the type of duplex system (e.g., half or full duplex), it should be appreciated that the grouping of communication paradigms can be based on other communication characteristics. In another example embodiment, groupings of communication paradigms can be based on the type of communication medium. Here, for example, telephones 150 communicate with each other using the same medium for communication, namely PSTN 104. Accordingly, PSTN 104 can be grouped into one communication paradigm. Similarly, cellular network 109, computer network 106, and radio network 108 can each be grouped into separate communication paradigms. Therefore, for example, instant messaging between computers 151 are within the same communication paradigm. Communication between UHF radios, such as UHF radio 153, is associated with another communication paradigm. As such, communication between instant messaging using computers 151 and UHF radio 153 is between different communication paradigms.

Interoperability and collaboration system 102 facilitates communication interoperability between different communication paradigms. For example, interoperability and collaboration system 102 can facilitate communication between radio network 108 and VoIP endpoints, such as VoIP phone 152, by controlling the media and signaling of radio and VoIP systems, which results in a direct communication of UHF radio 153 with the VoIP phone. Similarly and additionally, interoperability and collaboration system 102 can facilitate communication between radio network 108 and PSTN 104 by sending radio traffic over computer network 106 to the PSTN, which facilitates communication of UHF radio 153 with telephones 150.

Figure 2:
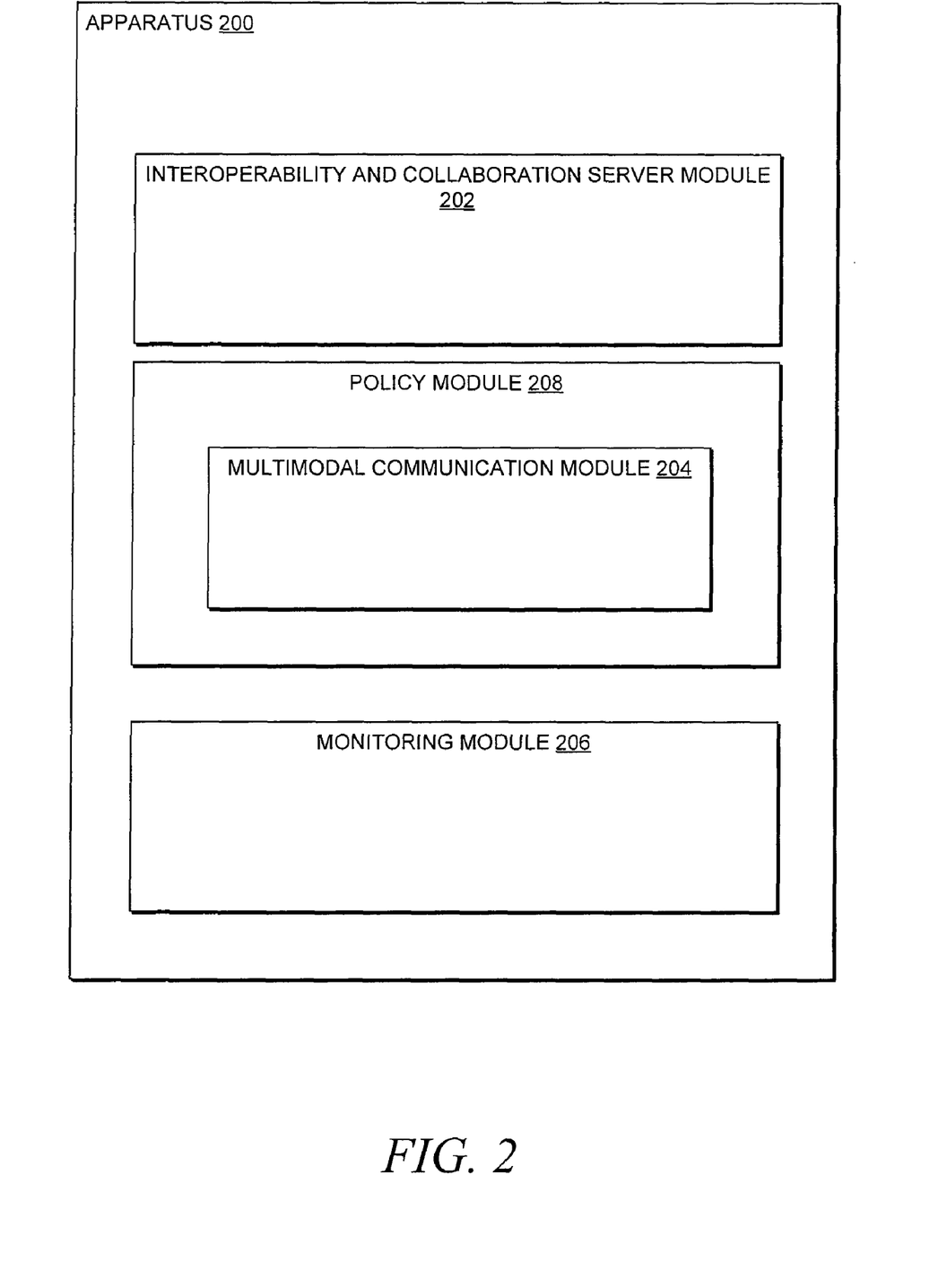
FIG. 2 is a simplified block diagram of modules, in accordance with an example embodiment, included in an apparatus.

FIG. 2 is a simplified block diagram of modules, in accordance with an example embodiment, included in an apparatus. Apparatus 200 may include a variety of computing devices associated with an interoperability and collaboration system. For example, apparatus 200 may be a server included in the interoperability and collaboration system. The server may be a media convergence server, such as a Cisco Systems, Inc. Media Convergence Server (MCS). As shown in FIG. 2, apparatus 200 includes interoperability and collaboration server module 202, policy module 208, and monitoring module 206. In general, interoperability and collaboration server module 202 manages resources, media, and information. For example, interoperability and collaboration server module 202 provides authentication and security services and provides integration with various media resources, such as router media service (RMS) components (e.g., Cisco Systems, Inc. Universal Media Server (UMS)), Push-to-talk Management Center (PMC) clients, and VoIP phones. Furthermore, interoperability and collaboration server module 202 facilitates interconnection between voice channels and talk groups, which is explained in more detail below. The Cisco Systems, Inc. Internet Protocol Interoperability and Collaboration System (IPICS) is an example of an interoperability and collaboration server module 202.

Policy module 208 provides for the creation of policies that define operating procedures. Examples of operating procedures include talk group establishment and notification. The Cisco Systems, Inc. Internet Protocol Policy Engine (IPPE) is an example of a policy module 208. In an example embodiment, policy module 208 includes multimodal communication module 204. In an example embodiment, multimodal communication module 204 may be configured to access a list of communication preferences and to access link quality information associated with one or more communication paradigms. As explained in more detail below, multimodal communication module 204 may switch communication between different communication paradigms based on the link quality information.

In an example embodiment, apparatus 202 may additionally host monitoring module 206. As explained in more detail below, monitoring module 206 may be configured to monitor communication paths associated with various communication paradigms and to access the quality of the links amongst various endpoints (e.g. communication devices). The monitoring module 206 may then provide the information about the quality of the links (or link quality information) to multimodal communication module 204.

It should be appreciated that in other example embodiments, apparatus 200 may include fewer or more modules apart from those shown in FIG. 2. For example, policy module 208 may be separated from multimodal communication module 204. Alternatively, in another example, apparatus 200 may not host monitoring module 206. Instead, monitoring module 206 may be hosted on another computing device, such as a router media service, which is explained in more detail below.

Figure 3:
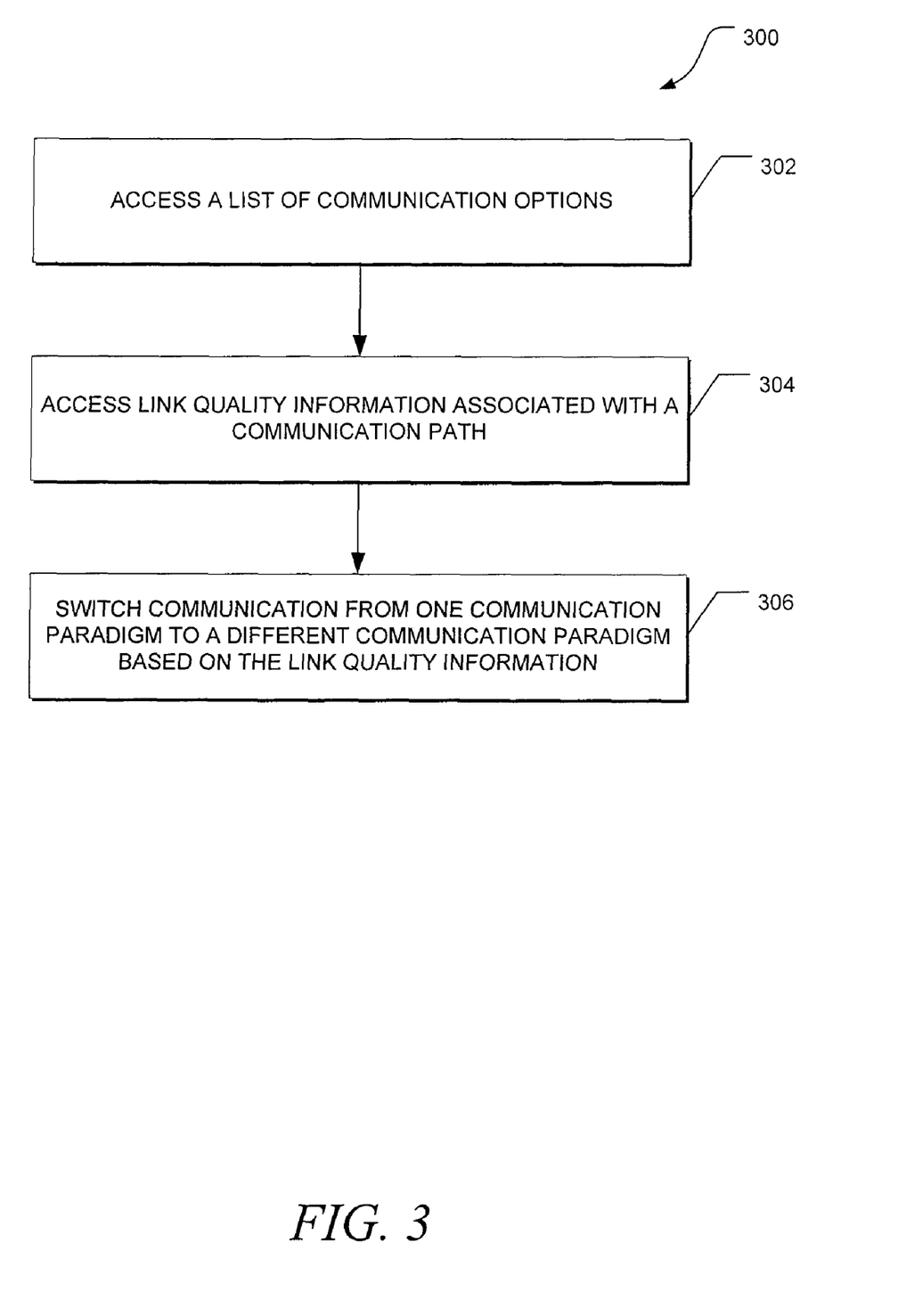
FIG. 3 is a flow diagram of a general overview of a method, in accordance with an example embodiment, for switching communication between different communication paradigms.

FIG. 3 is a flow diagram of a general overview of a method, in accordance with an example embodiment, for switching communication between different communication paradigms. In an example embodiment, method 300 may be implemented by multimodal communication module 204 shown in FIG. 2 and employed in apparatus 200. As shown in FIG. 3, a list of communication preferences is accessed at 302. The list of communication preferences identifies or defines a series of communication paradigms. For example, the list may include a series of communication paths amongst users. These communication paths can be amongst a variety of different communication paradigms. For example, the list may include a communication path amongst a radio network and another communication path amongst a computer network. In another example, the list may include a first communication path amongst a radio network, a second communication path amongst a computer network, and a third communication path amongst a PSTN. A user may use the list to define communication preferences. For example, if the user cannot be reached by way of a communication paradigm, then the user can be contacted by way of a different communication paradigm. The list may include, for example, telephone numbers, Internet protocol (IP) addresses, radio channels, email addresses, and other information. The list may be stored in a variety of data structures, such as arrays, tables, databases, and other data structures.

In addition, link quality information associated with a communication path amongst a communication paradigm is accessed at 304. The link quality information includes a variety of data associated with the quality and/or connectivity of a communication link. The quality and connectivity of a communication link may be quantified by a variety of measurements. An example of link quality information may include a signal-to-noise ratio associated with a communication path. In another example, the link quality information may include a flag that indicates whether a communication path is connected or disconnected. It should be appreciated that a communication path is a connection or communication path between two or more nodes. A communication path establishes a link between two or more nodes. Access to link quality information may include retrieving the link quality information that is stored in the interoperability and collaboration system or receiving the link quality information from another source. For example, the interoperability and collaboration system may monitor the communication paths and generate link quality information associated with each communication path. In another example, as explained in more detail below, a computing device may monitor the communication paths to generate the link quality information. This computing device may then transmit the link quality information to the interoperability and collaboration system.

Here, communication is established between two or more nodes by way of a communication path. As discussed above at 304, link quality information associated with the communication path amongst a communication paradigm is accessed. At 306, communication may be switched from this communication paradigm to a different communication paradigm, which is identified in the list of communication preferences, based on the link quality information. In an example embodiment, a policy defines the rules or instructions for switching based on the link quality information. The policy is based on the link quality information. For example, the policy may instruct that communication be switched from the communication paradigm to a different communication paradigm when link quality information identifies that communication utilizing the a communication path amongst the communication paradigm has deteriorated. In another example, the policy may instruct that communication be switched from the communication paradigm to the different communication paradigm when link quality information identifies that communication utilizing the communication path amongst the communication paradigm has been disconnected.

Figure 4:
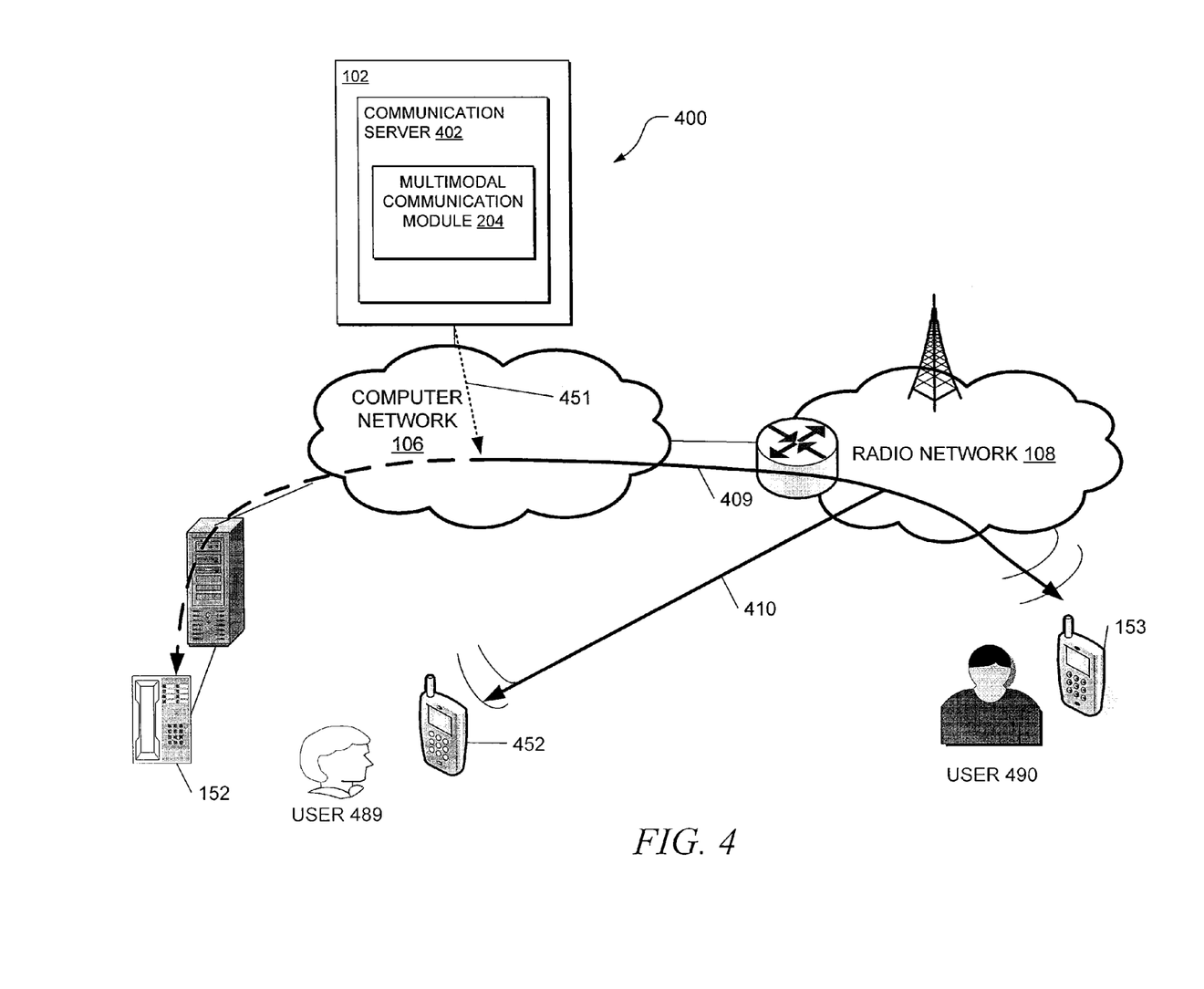
FIG. 4 is a simplified system diagram, in accordance with an example embodiment, illustrating the switch one communication paradigm to a different communication paradigm.

FIG. 4 is a simplified system diagram, in accordance with an example embodiment, illustrating the switch from one communication paradigm to a different communication paradigm. System 400 shows interoperability and collaboration system 102 in communication over computer network 106. As shown in FIG. 4, radio network 108 is also in communication with computer network 106. VoIP phone 152 and UHF radios 153 and 452, are in communication with computer network 106 and radio network 108, respectively. The interoperability and collaboration system 102 includes communication server 402, and the communication server hosts multimodal communication module 204.

Initially, user 489 uses VoIP phone 152 to communicate with user 490 on UHF radio 153. The VoIP phone 152 is associated with computer network 106 while UHF radio 153 is connected to radio network 108. Interoperability and collaboration system 102 facilitates communication interoperability amongst the different communication paradigms (e.g., computer network 106 and radio network 108). As shown in FIG. 4, VoIP phone 152 is in communication with UHF radio 153 by way of communication path 409. Interoperability and collaboration system 102 can additionally monitor communication path 409.

The multimodal communication module 204 hosted on communication server 402 initially accesses a list of communication preferences for user 489. The list of communication preferences is stored in communication server 402 and, in this example, the list identifies an alternate communication path 410 amongst radio network 108 (e.g. a UHF channel). The user 489 previously defined alternate communication path 410 in the list of communication preferences as an alternative contact amongst a different communication paradigm for situations where, for example, communication utilizing communication path 409 is not feasible or has deteriorated. During communication between user 489 and 490, communication path 409 is monitored to generate link quality information. Here, in an example embodiment, the link quality information identifies whether VoIP phone 152 is connected to UHF radio 153. For example, link quality information may be a flag (e.g., a bit value) that indicates communication path 409 is connected or disconnected.

The multimodal communication module 204 accesses the link quality information and may switch to alternate communication path 410 amongst radio network 108 based on the link quality information. Although communication path 410 is illustrated as passing through radio network 108 directly, it should be appreciated that the communication path may in affect include segments going through computer network 106. As such, computer network 106 and interoperability and collaboration system 102 may play an active role in facilitating communication amongst different radio channels including UHF to UHF, VHF to VHF, and UHF to VHF connections.

Multimodal communication module 204 may switch communication from communication path 409 to alternate communication path 410 by sending control signal 451 to a device within computer network (e.g., a router) to route to or select alternate communication path 410. For example, if the link quality information identifies that VoIP phone 152 is connected to UHF radio 153, then communication path 409 is maintained. On the other hand, if the link quality information identifies that VoIP phone 152 is disconnected from UHF radio 153 (as indicated in FIG. 4 by a dashed line), then multimodal communication module 204 switches communication from communication path 409 to alternate communication path 410 amongst a different communication paradigm, namely radio network 108 instead of computer network 106. In this example, upon detection that communication path 409 is disconnected, multimodal communication module 204 retrieves a UHF channel of UHF radio 452 from the list of communication preferences and connects to the UHF radio to reach user 489. As a result, if communication amongst a communication paradigm goes down (e.g., a portion of computer network 106 used by communication path 409), then interoperability and collaboration system 102 can maintain communication between users 489 and 490 by switching to a different communication paradigm (e.g., radio network 108).

Figure 5:
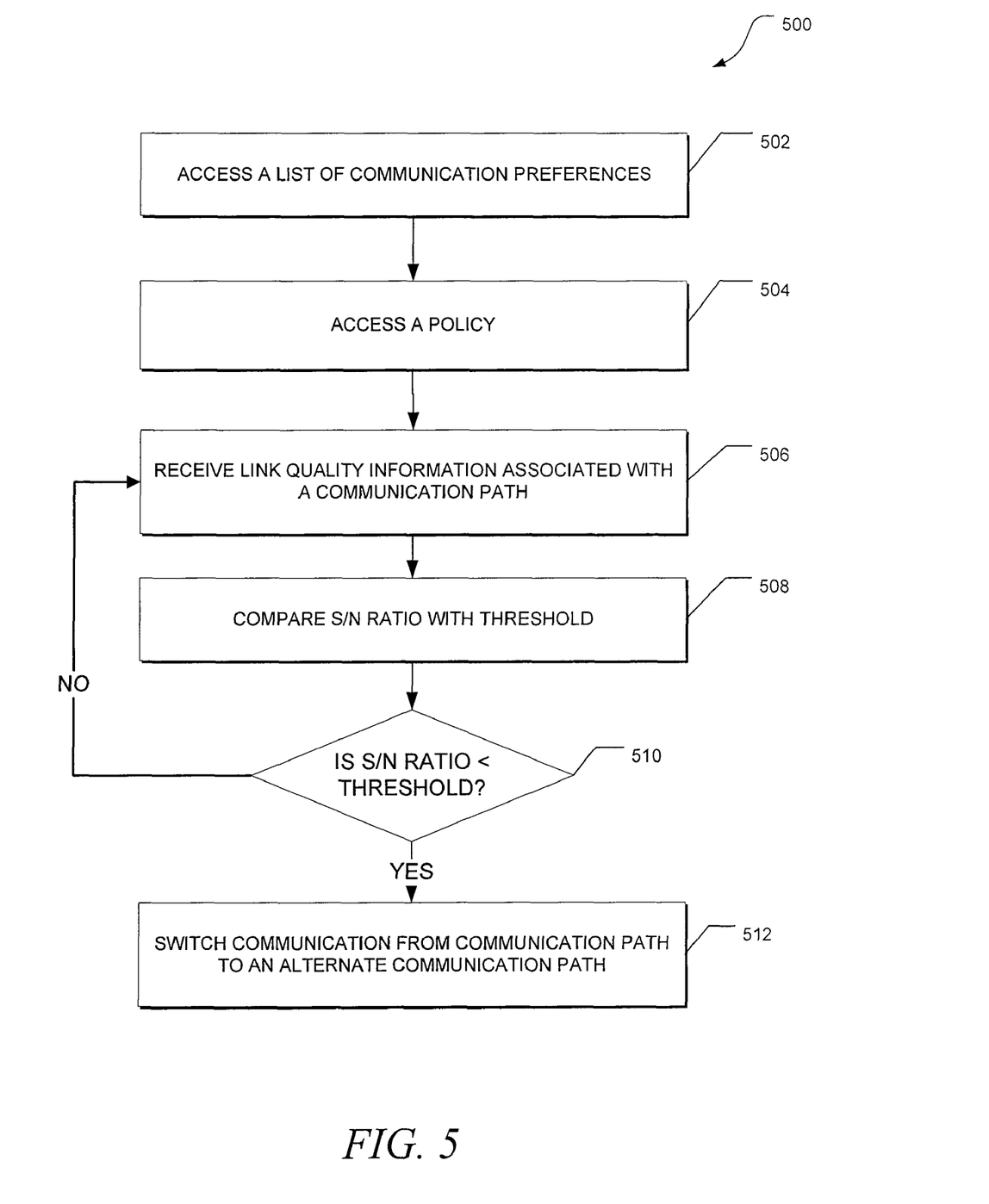
FIG. 5 is a flow diagram of detailed operations, in accordance with an example embodiment, for switching communication between different communication paradigms.

FIG. 5 is a flow diagram of detailed operations, in accordance with an example embodiment, for switching communication between different communication paradigms. In an example embodiment, method 500 may be implemented by multimodal communication module 204 shown in FIG. 2 and employed in apparatus 200. As shown in FIG. 5, a list of communication preferences is accessed at 502. In this example, the list of communication paths identifies one or more alternate communication paths amongst various communication paradigms. In addition, a policy is accessed at 504. The policy may be stored in and accessed from a policy module. Here, the policy defines a variety of operating procedures associated with switching from one communication paradigm to a different communication paradigm based on link quality information. The switch from a communication paradigm to a different communication paradigm can therefore be based on the policy. In an example embodiment, the policy defines the procedures for switching when communication utilizing a communication path amongst a communication paradigm has deteriorated. In this example, the policy defines that communication is to be switched from a communication path amongst a communication paradigm to an alternate communication path amongst a different communication paradigm when the signal-to-noise ratio is less than a predefined threshold.

Communication is established by way of a communication paradigm and, after the policy and the list of communication preferences are accessed, link quality information associated with the communication paradigm is received at 506. In this example, the link quality information is the signal-to-noise ratio of the communication path amongst the communication paradigm. It should be noted that in addition to signal-to-noise ratio, other parameters may also be used. The signal-to-noise ratio is compared with a predefined threshold signal-to-noise ratio at 508. With reference to 510, if the signal-to-noise ratio exceeds the predefined threshold, then the communication by way of the communication paradigm is maintained. The link quality information associated with the communication paradigm may be continuously received and compared with the threshold.

On the other hand, if the signal-to-noise ratio is less than the threshold, then communication utilizing the current communication path has deteriorated below an acceptable level, as defined in the policy. As a result, communication is switched at 512 from the communication path to an alternate communication path as defined in the list of communication preferences. It should be appreciated that this alternate communication path is amongst a different communication paradigm. For example, if the original communication path is amongst a PSTN, then the alternate communication path is not amongst the PSTN. Instead, this alternate communication path can be amongst a radio network, a computer network or other communication paradigms.

Figure 6:
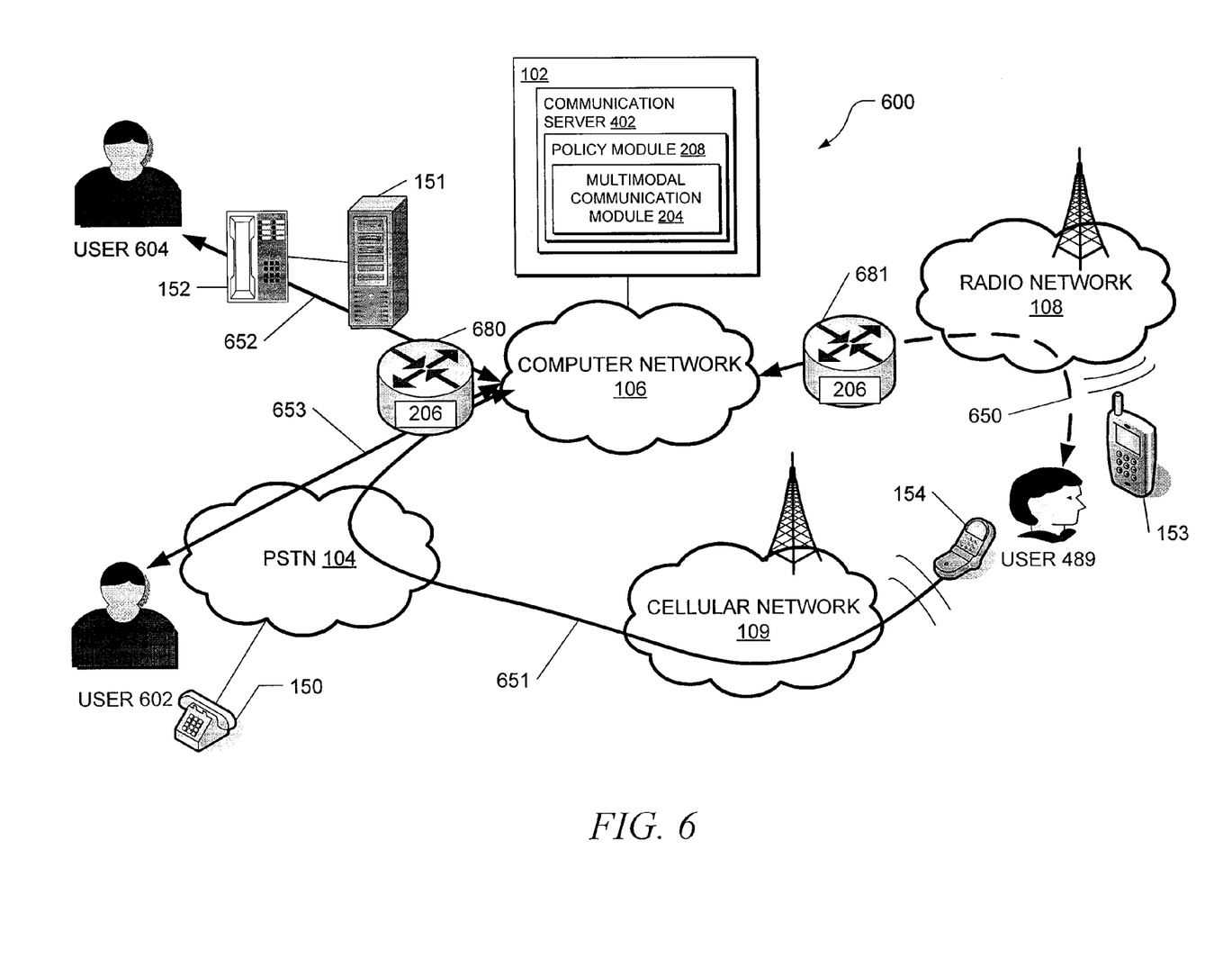
FIG. 6 is a simplified system diagram, in accordance with another example embodiment, illustrating the switch from one communication paradigm to a different communication paradigm.

FIG. 6 is a simplified system diagram, in accordance with another example embodiment, illustrating the switch from one communication paradigm to a different communication paradigm. System 600 shows interoperability and collaboration system 102 in communication computer network 106. PSTN 104, cellular network 109, and radio network 108 are also in communication with computer network 106. A variety of communication devices may be connected to PSTN 104, computer network 106, cellular network 109, and radio network 108. For example, telephone 150 is connected to PSTN 104. Mobile phone 154 is connected to (or in communication) with cellular network 109. UHF radio 153 is connected to (or in communication) with radio network 108. Computer 151 and VoIP phone 152 are connected to computer network 106.

Also included in system 600 are router media services 680 and 681, which are in communication with computer network 106 and other communication systems, such as radio network 108 and PSTN 104, and communication devices, such as computer 151. In general, router media services 680 and 681 are configured to mix different communication paths, such as communication paths 651, 623, and 652. Furthermore, as explained in more detail below, router media services 680 and 681 may combine two or more talk groups and enable media convergence for multicast nodes, unicast nodes, TDMA nodes, and other nodes.

Interoperability and collaboration system 102 includes communication server 402, which hosts policy module 208. In this example embodiment, multimodal communication module 204 is included in policy module 208. In addition, router media services 680 and 681 are configured to host monitoring modules 206. The monitoring modules 206 are configured to monitor communication paths 650-653 and to generate link quality information associated with each of the communication paths. Monitoring modules 206 then transmit the link quality information to multimodal communication module 204.

As shown in FIG. 6, user 489 initially uses UHF radio 153 to communicate with user 604 on VoIP phone 152 and user 602 on telephone 150. VoIP phone 152 is connected to computer network 106, UHF radio 153 is in communication with radio network 108, and telephone 150 is connected to PSTN 104. Users 602, 604, and 489 communicate by way of a talk group that is formed from multiple communication paths 650, 652, and 653.

Multimodal communication module 204 hosted on communication server 402 initially accesses a list of communication preferences for user 489. The list of communication preferences is stored in communication server 402 and, in this example, the list identifies an alternate communication path 651 amongst cellular network 109 (e.g. a telephone number). The user 489 previously defined alternate communication path 651 in the list of communication preferences as an alternative contact amongst a different communication paradigm in situations where communication amongst communication path 650 is not feasible. Additionally, multimodal communication module 204 may access a policy stored in policy module 208. Here, the policy defines the procedures for switching when communication amongst a communication path has deteriorated. For example, the policy defines that communication is to be switched from communication path 650 to an alternate communication path 651 when the link quality associated with communication path 650 is less than a predefined threshold.

During communication between users 489, 602 and 604 utilizing communication paths 650, 652, and 653, monitoring modules 206 monitor the communication paths and generates link quality information (e.g., the signal-to-noise ratio) for each of the communication paths. The monitoring modules 206 then transmit the signal-to-noise ratios to multimodal communication module 204.

Multimodal communication module 204 receives the signal-to-noise ratios from monitoring modules 206 and compares the signal-to-noise ratio associated with communication path 650 to the threshold signal-to-noise ratio defined by the policy. If the signal-to-noise ratio associated with communication path 650 is greater than the threshold, then the communication path is maintained. However, if the signal-to-noise ratio associated with communication path 650 is less than (or deteriorates below) the threshold, then multimodal communication module 204 switches communication from communication path 650 to alternate communication path 651 amongst a different communication paradigm, namely cellular network 109 instead of radio network 108. As part of the switching process, multimodal communication module 204 patches alternate communication path 651 back to the talk group with users 602 and 604.

When communication is established with user 489 utilizing alternate communication path 651, monitoring module 206 also monitors this communication path, generates link quality information (e.g., the signal-to-noise ratio) associated with this communication path, and transmits the link quality information to multimodal communication module 204. If the signal-to-noise ratio of alternate communication path 651 is greater than the threshold, then communication is maintained. However, if the signal-to-noise ratio deteriorates below the threshold, then multimodal communication module 204 may switch yet to another communication path as defined in the list of communication preferences. In another example embodiment, if no alternate communication paths are available to contact user 489 or all communication paths, such as communication paths 650 and 651, are down or not available, then multimodal communication module 204 may be configured to transmit a message to the talk group. This message, for example, may notify one or more members of the talk group, such as users 602 and/or 604, that communication cannot be established with communication paths 650 and 651 used to contact user 489. Messages may be in the form of a chat message, an email-message, an automated voice message, or other messages.

Figure 7:
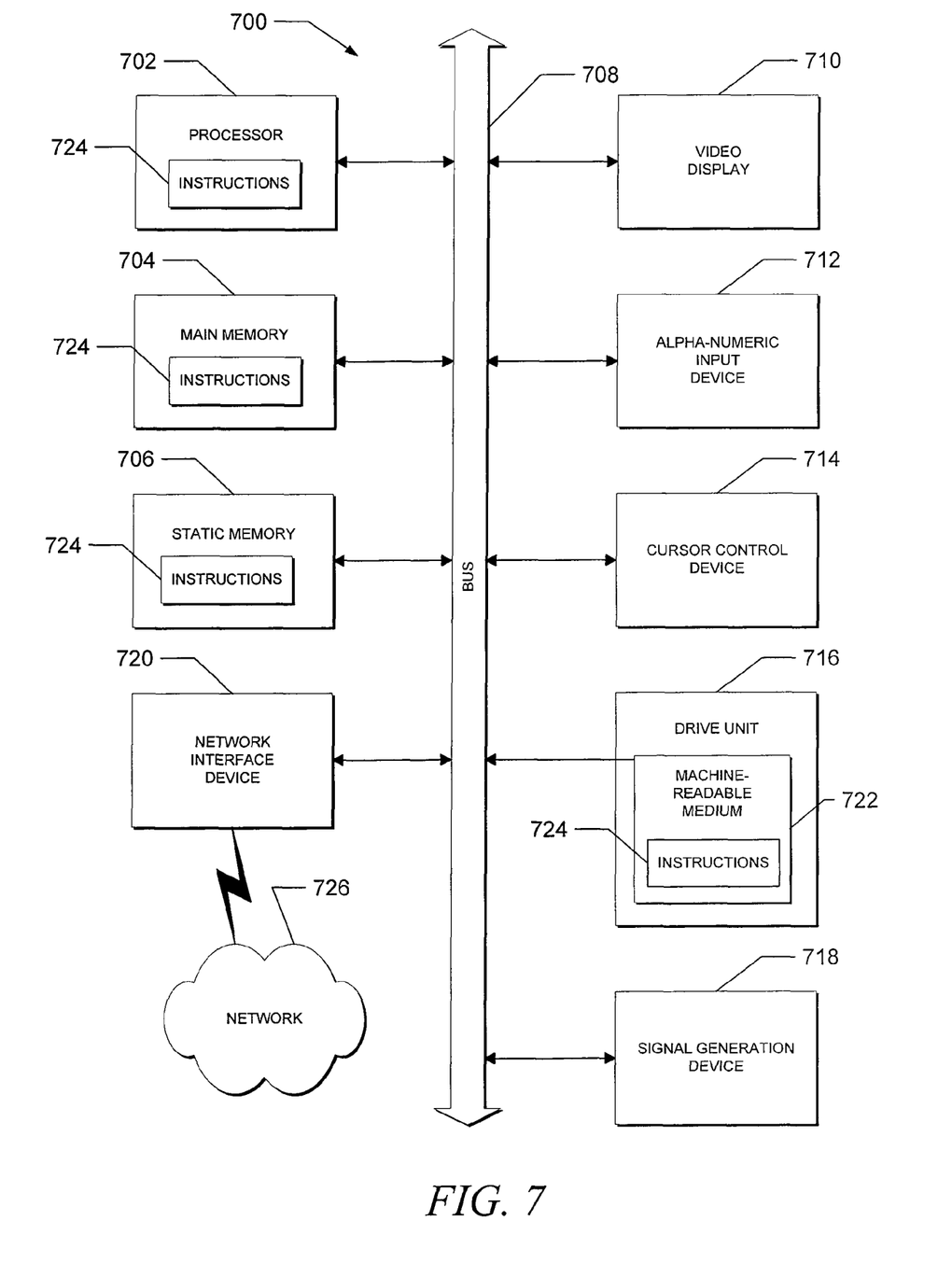
FIG. 7 is a simplified block diagram of a machine in the example form of a computing system within which a set of instructions, for causing the machine to perform any one or more of the methodologies discussed herein, may be executed.

FIG. 7 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 700 includes processor 702 (e.g., a central processing unit (CPU), a graphics processing unit (GPU) or both), main memory 704 and static memory 706, which communicate with each other via bus 708. Computing system 700 may further include video display unit 710 (e.g., a plasma display, a liquid crystal display (LCD) or a cathode ray tube (CRT)). Computing system 700 also includes alphanumeric input device 712 (e.g., a keyboard), user interface (UI) navigation device 714 (e.g., a mouse), disk drive unit 716, signal generation device 718 (e.g., a speaker) and network interface device 720.

Disk drive unit 716 includes machine-readable medium 722 on which is stored one or more sets of instructions and data structures (e.g., software 724) embodying or utilized by any one or more of the methodologies or functions described herein. Software 724 may also reside, completely or at least partially, within main memory 704 and/or within processor 702 during execution thereof by computing system 700, with main memory 704 and processor 702 also constituting machine-readable, tangible media. Software 724 may further be transmitted or received over network 726 via network interface device 720 utilizing any one of a number of well-known transfer protocols (e.g., Hypertext Transfer Protocol (HTTP)).

While machine-readable medium 722 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method at a communication server, the method comprising:
    accessing a list of communication preferences, the list identifying a communication paradigm that is associated with a full duplex system, a different communication paradigm that is associated with a half duplex system, the communication paradigm being a mode of communication amongst a collection of interrelated communication devices, the different communication paradigm being a different mode of communication amongst a different collection of interrelated communication devices, the list of communication preferences further identifying the different communication paradigm as an alternative to the communication paradigm;
    accessing link quality information associated with the communication paradigm; and
    switching communication, using a processor at the communication server, from the communication paradigm to the different communication paradigm based on the link quality information,
    wherein a policy defines a threshold and the link quality information further comprises a signal-to-noise ratio, and wherein communication is switched from the communication paradigm to the different communication paradigm when the signal-to-noise ratio exceeds the threshold.

2. The method of claim 1, wherein the communication is switched from the communication paradigm to the different communication paradigm based on a policy, the policy being based on the link quality information.

3. The method of claim 1, wherein the link quality information identifies that communication utilizing a communication path amongst the communication paradigm is deteriorated.

4. The method of claim 1, further comprising transmitting a message to a talk group, the message notifying that communication cannot be established with the different communication paradigm, and wherein the talk group is formed from a plurality of communication paths amongst a plurality of users.

5. The method of claim 1, further comprising monitoring a communication path associated with the communication paradigm.

6. A communication server comprising:
a memory configured to store a multimodal communication module; and
a processor in communication with the memory, the processor being configured to execute the multimodal communication module, the multimodal communication module to:
access a list of communication preferences, the list identifying a communication paradigm that is associated with a full duplex system, the communication paradigm being a mode of communication amongst a collection of interrelated communication devices, the different communication paradigm being a different mode of communication amongst a different collection of interrelated communication devices, the list of communication preferences further identifying the different communication paradigm as an alternative to the communication paradigm;
access link quality information associated with the communication paradigm; and
switch communication from the communication paradigm to the different communication paradigm based on the link quality information,
wherein a policy defines a threshold and the link quality information further comprises a signal-to-noise ratio, and wherein communication is switched from the communication paradigm to the different communication paradigm when the signal-to-noise ratio exceeds the threshold.

7. The communication server of claim 6, where the memory is further configured to store a policy module, the policy module being in communication with the multimodal communication module and to store a policy, the policy being based on the link quality information, the multimodal communication module to further:
access the policy;
switch communication from the communication paradigm to the different communication paradigm based on the policy.

8. The communication server of claim 6, where the memory is further configured to store a monitoring module, the monitoring module being in communication with the multimodal communication module and to monitor a communication path amongst the communication paradigm.

9. The communication server of claim 6, where the link quality information identifies that communication utilizing a communication path amongst the communication paradigm is deteriorated.

10. The communication server of claim 6, wherein the multimodal communication module to further transmit a message to a talk group, the message notifying that communication cannot be established with the different communication paradigm, and wherein the talk group is formed from a plurality of communication paths amongst a plurality of users.

11. The communication server of claim 6, wherein the communication paradigm is associated with a public switched telephone network and the different communication paradigm is associated with a radio network.

12. A system comprising:
a first communication device;
a second communication device; and
a communication server in communication with the first communication device by way of a communication paradigm that is associated with a full duplex system, the communication server to:
access a list of communication preferences, the list identifying a different communication paradigm that is associated with a half duplex system, the communication server to communicate with the second communication device by way of the different communication paradigm, the communication paradigm being a mode of communication amongst a collection of interrelated communication devices, the different communication paradigm being a different mode of communication amongst a different collection of interrelated communication devices, the list of communication preferences further identifying the different communication paradigm as an alternative to the communication paradigm;
access link quality information associated with the communication paradigm; and
switch communication from the communication paradigm to the different communication paradigm based on the link quality information,
wherein a policy defines a threshold and the link quality information further comprises a signal-to-noise ratio, and wherein communication is switched from the communication paradigm to the different communication paradigm when the signal-to-noise ratio exceeds the threshold.

13. The system of claim 12, wherein the communication is switched from the communication paradigm to the different communication paradigm based on a policy, the policy being based on the link quality information.

14. The system of claim 12, wherein the communication server to further transmit a message to a talk group, the message notifying that communication cannot be established with the different communication paradigm, and wherein the talk group is formed from a plurality of communication paths amongst a plurality of users.

15. The system of claim 12, wherein the communication server to further monitor a communication path amongst the communication paradigm.

16. The system of claim 12, wherein the communication paradigm is associated with a cellular network and the different communication paradigm is associated with a radio network.

17. A communication server comprising:
an interoperability and collaboration server module for accessing a list of communication preferences, the list identifying and collaboration server module for accessing a list of communication preferences, the list identifying a communication paradigm that is associated with a full duplex system, a different communication paradigm that is associated with a half duplex system, the communication paradigm being a mode of communication amongst a collection of interrelated communication devices, the different communication paradigm being a different mode of communication amongst a different collection of interrelated communication devices, the list of communication preferences further identifying the different communication paradigm as an alternative to the communication paradigm;

a monitoring module for accessing link quality information associated with the communication paradigm; and a means for switching communication from the communication paradigm to the different communication paradigm based on the link quality information, wherein a policy defines a threshold and the link quality information further comprises a signal-to-noise ratio, and wherein communication is switched from the communication paradigm to the different communication paradigm when the signal-to-noise ratio exceeds the threshold.

* * * * *